US006236547B1

(12) United States Patent
Yamamoto

(10) Patent No.: US 6,236,547 B1
(45) Date of Patent: May 22, 2001

(54) ZENER ZAPPING DEVICE AND ZENER ZAPPING METHOD

(75) Inventor: Masahiro Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/352,874

(22) Filed: Jul. 13, 1999

(30) Foreign Application Priority Data

Apr. 7, 1999 (JP) ... 11-099788

(51) Int. Cl.[7] ... H02H 9/00
(52) U.S. Cl. ... 361/58; 323/313
(58) Field of Search ... 361/18, 58; 257/551; 323/313–317, 354; 327/539, 584

(56) References Cited

U.S. PATENT DOCUMENTS 5,446,407 * 8/1995 Yamamoto ... 327/525

FOREIGN PATENT DOCUMENTS 5-232151 9/1993 (JP) ... G01R/19/165

* cited by examiner

*Primary Examiner*—Ronald W. Leja
(74) *Attorney, Agent, or Firm*—Oblon, Spivak, McClelland, Maier & Neustadt, P.C.

(57) ABSTRACT

An object of the invention is to obtain a Zener zapping device which can reduce the time required for Zener-zapping and the scale of the device. A voltage setting circuit has a terminal (1), a current source (2) having its one end grounded, a Zener diode (ZD, 6*a*) having its one end connected to the terminal (1) and the other end of the current source (2), a resistor (5*a*) having its one end connected to the terminal (1), a relay (7*a*) having its one end connected to the other end of the current source (2), a ZD (6*b*) having its one end connected to the other end of the resistor 5*a*, the other end of the ZD (6*a*), and the other end of the relay (7*a*), a resistor (5*b*) having its one end connected to the other end of the resistor (5*a*) and the other end of the ZD (6*a*), a relay (7*b*) having its one end connected to the other end of the ZD (6*a*) and the other end of the relay (7*a*), a ZD (6*c*) having its one end connected to the other end of the resistor (5*b*), the other end of the ZD (6*b*), and the other end of the relay (7*b*), and its other end grounded, a resistor (5*c*) having its one end connected to the other end of the resistor (5*b*) and the other end of the ZD (6*b*), and its other end grounded, and a relay (7*c*) having its one end connected to the other end of the ZD (6*b*) and the other end of the relay (7*b*), and its other end grounded.

4 Claims, 7 Drawing Sheets

FIG. 4

| ZENER DIODES TO BE ZENER-ZAPPED | | | RELAYS TO BE SET IN CONDUCTIVE-STATE | | |
|---|---|---|---|---|---|
| 6a | 6b | 6c | 7a | 7b | 7c |
| O | O | O | X | X | X |
| O | O | X | X | X | O |
| O | X | O | X | O | X |
| O | X | X | X | O | O |
| X | O | O | O | X | X |
| X | O | X | O | X | O |
| X | X | O | O | O | X |
| X | X | X | O | O | O |

F/G. 5

BACKGROUND ART

ZENER ZAPPING DEVICE AND ZENER ZAPPING METHOD

BACKGROUND OF THE INVENTION

1. Field of the Invention

The present invention relates to a Zener zapping device forming a voltage setting circuit for generating a highly accurate voltage supplied to analog integrated circuitry etc., and to a Zener zapping method using the Zener zapping device.

2. Description of the Background Art

Conventionally, the Zener zapping technique has been widely used as a method for controlling variations in analog integrated circuits etc. caused in manufacture after the manufacture so as to generate highly accurate voltage. FIG. 5 is a circuit diagram showing part of a structure of a semiconductor integrated circuit. The semiconductor integrated circuit shown in FIG. 5 has a terminal 101 at which the voltage is to be set (the potential at the terminal 101 is taken as $V_{ref}$), a Zener diode 106*a* having its one end connected to the terminal 101, a resistor 105*a* (having a resistance value R1) having its one end connected to the terminal 101, a Zener diode 106*b* having its one end connected to the other end of the resistor 105*a* and to the other end of the Zener diode 106*a*, a resistor 105*b* (having a resistance value R2) having its one end connected to the other end of the resistor 105*a* and to the other end of the Zener diode 106*a*, a Zener diode 106*c* having its one end connected to the other end of the resistor 105*b* and to the other end of the Zener diode 106*b* and its other end grounded, and a resistor 105*c* (having a resistance value R3) having its one end connected to the other end of the resistor 105*b* and to the other end of the Zener diode 106*b* and its other end grounded.

The semiconductor integrated circuit shown in FIG. 5 also has a resistor 104*a* (having a resistance value R4) having its one end connected to a voltage source 103 (having a potential VB) and its other end connected to the terminal 101, and a resistor 104*b* (having a resistance value R5) having its one end connected to the terminal 101 and its other end grounded. Further, the semiconductor integrated circuit shown in FIG. 5 has a terminal 108*a* connected to the one end of the Zener diode 106*a*, a terminal 108*b* connected to the other end of the Zener diode 106*a* and to the one end of the Zener diode 106*b*, a terminal 108*c* connected to the other end of the Zener diode 106*b* and to the one end of the Zener diode 106*c*, and a terminal 108*d* connected to the other end of the Zener diode 106*c*.

Generally, when a Zener voltage in reverse direction is not applied to a Zener diode, the Zener diode is in an open state between its one end and the other end. When an excessive current in the reverse direction is instantaneously passed to the Zener diode, the Zener diode causes a Zener breakdown and one end and the other end of the Zener diode are short-circuited.

FIG. 6 is a circuit diagram showing an example of a voltage setting circuit for setting the potential $V_{ref}$. In FIG. 6, the part surrounded by the one-dot chain line corresponds to the semiconductor integrated circuit shown in FIG. 5, and the outside of the one-dot chain line is a Zener zapping device connected to the semiconductor integrated circuit. A current source 102 has its one end grounded, and the grounded end is connected to the terminal 108*c* and its other end is connected to the terminal 108*a*, so that a current I is supplied from the current source 102 to the terminal 108*a*. Then a current I1 flows to the Zener diodes 106*a* and 106*b* in the reverse direction to cause the Zener diodes 106*a* and 106*b* to undergo Zener breakdown. While part of the current I flows also to the resistors 104*b*, 105*a*, and 105*b* as a current I2, it is possible to cause Zener breakdown at the Zener diodes 106*a* and 106*b* by setting the current value of the current I sufficiently large.

With the Zener breakdown of the Zener diodes 106*a* and 106*b*, one end and the other end of the Zener diode 106*a* and one end and the other end of the Zener diode 106*b* are respectively short-circuited. As a result, one end and the other end of the resistor 105*a* connected in parallel to the Zener diode 106*a* and one end and the other end of the resistor 105*b* connected in parallel to the Zener diode 106*b* are shorted respectively by the Zener diodes 106*a* and 106*b*, and then the resistors 105*a* and 105*b* do not function as resistance from the circuit standpoint. In this case, the potential $V_{ref}$ at the terminal 101 is given as (R5//R3)·VB/(R4+(R5//R3)).

As stated above, the combined resistance value of the resistors 104*a*, 104*b*, 105*a* to 105*c* can be varied by causing arbitrary ones of the Zener diodes 106*a* to 106*c* to undergo Zener breakdown to short both ends of arbitrary ones of the resistors 105*a* to 105*c*, which enables the potential $V_{ref}$ at the terminal 101 to be highly accurately set to a desired value.

However, such a conventional Zener zapping device has the following problems. FIG. 7 is a circuit diagram showing another example of the voltage setting circuit, which is intended particularly to cause the Zener diodes 106*a* and 106*c* to undergo Zener breakdown. A current source 102*a* has its one end grounded, and the grounded end is connected to the terminal 108*b* and its other end is connected to the terminal 108*a*; a current source 102*b* has its one end grounded, and the grounded end is connected to the terminal 108*d* and its other end is connected to the terminal 108*c*.

Passing a reverse current from the current source 102*a* to the Zener diode 106*a* through the terminal 108*a* causes the Zener diode 106*a* to undergo a Zener breakdown, and passing a reverse current from the current source 102*b* to the Zener diode 106*c* through the terminal 108*c* causes the Zener diode 106*c* to undergo a Zener breakdown.

However, when the current Ib is supplied from the current source 102*b* to the terminal 108*c*, part of the current Ib, the current Ib2, flows to the terminal 108*b* through the Zener diode 106*b*. Accordingly, when the current Ia from the current source 102*a* and the current Ib from the current source 102*b* are supplied at the same time, the current Ib2 functions as a current in the forward direction for the Zener diode 106*a* to clamp the potential at the terminal 108*b*, so that the Zener diode 106*a* cannot cause a Zener breakdown. Accordingly, when causing the Zener diodes 106*a* and 106*c* to undergo Zener breakdown in the voltage setting circuit shown in FIG. 7, it is necessary to separately supply the current Ia from the current source 102*a* and the current Ib from the current source 102*b*, which causes the problem that the Zener-zapping takes long time. Further, the need of the two current sources 102*a* and 102*b* causes the device scale of the Zener zapping device to be large.

SUMMARY OF THE INVENTION

A first aspect of the present invention is directed to a Zener zapping device for selectively Zener-zapping a plurality of Zener diodes in a semiconductor integrated circuit having the plurality of Zener diodes connected in series and a plurality of external terminals connected to one end, respective series connection points, and the other end of the series connection of the Zener diodes. According to the present invention, the Zener zapping device comprises: a current source having its one end grounded and its other end connected to the external terminal corresponding to the one end of the series connection; and a plurality of switches for selectively making a conductive state between the plurality of external terminals which are adjacent to each other along the connected sequence of the series connection.

According to a second aspect of the present invention, a Zener zapping method using the Zener zapping device according to the first aspect comprises the steps of: (a) turning off/on the switches in correspondence with Zener-zapping or not each of the plurality of Zener diodes; and (b) supplying a current from the current source after the step (a).

According to the first aspect of the invention, the current supplied from the current source can be passed to arbitrary one or ones of the plurality of Zener diodes by arbitrarily turning on/off the switches. Accordingly the Zener zapping device can be constructed by using a single current source to reduce the scale of the device.

According to the second aspect of the invention, the current supplied from the current source can be passed to arbitrary one or ones of the plurality of Zener diodes by arbitrarily turning on/off the switches. Accordingly it is possible to reduce the time required for Zener-zapping.

The present invention has been made to solve the above-described problems, and an object of the invention is to provide a Zener zapping device which can reduce the time required for Zener-zapping and the scale of the device, and a Zener zapping method using the Zener zapping device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the correspondence between Zener diodes to be Zener zapped and relays to be set in the conductive state.

DESCRIPTION OF THE PREFERRED EMBODIMENTS

First Preferred Embodiment

Figure 1:
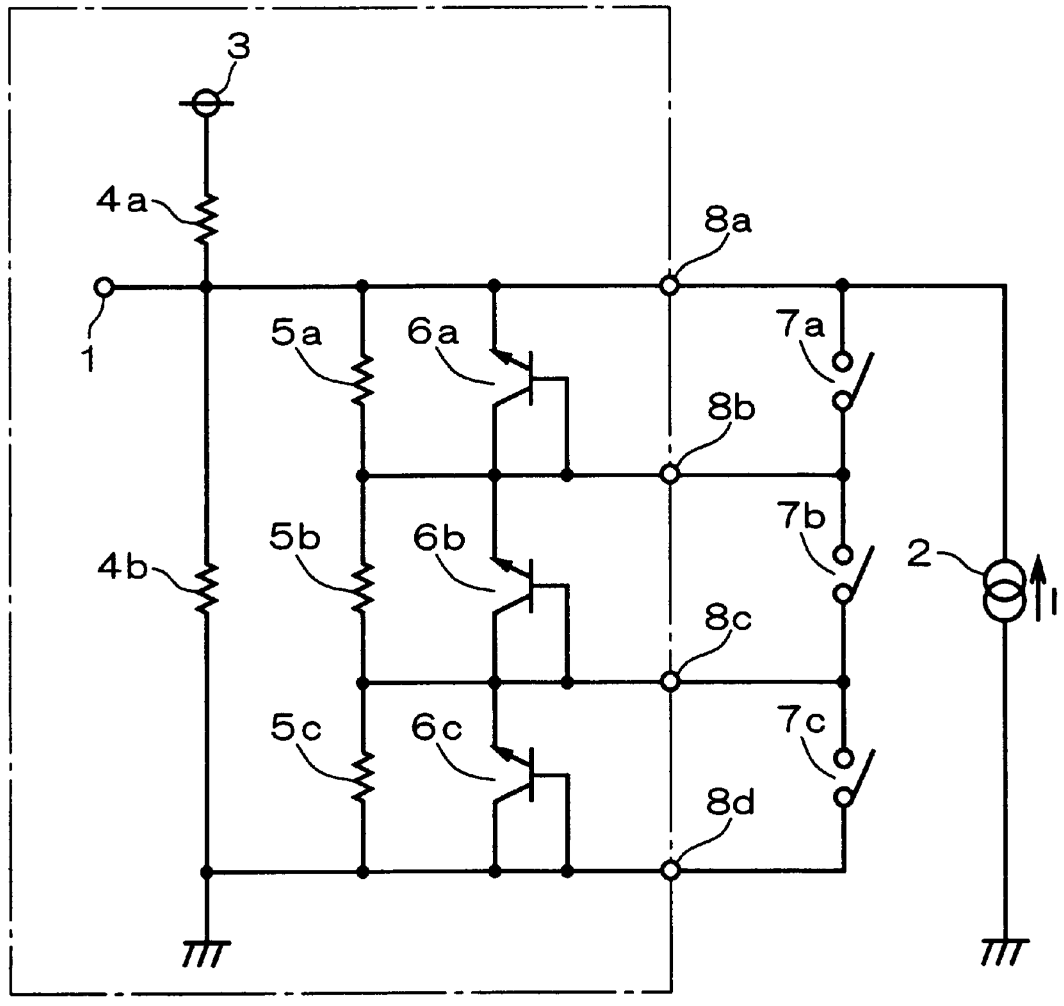
FIG. 1 is a circuit diagram showing the structure of a voltage setting circuit using a Zener zapping device of a first preferred embodiment of the present invention.

FIG. 1 is a circuit diagram showing the structure of a voltage setting circuit using a Zener zapping device according to a first preferred embodiment of the present invention. In FIG. 1, the part surrounded by the one-dot chain line shows part of a semiconductor integrated circuit, and the outside of the line shows a Zener zapping device connected to the semiconductor integrated circuit. The voltage setting circuit shown in FIG. 1 has a terminal 1 (the potential at the terminal 1 is taken as $V_{ref}$) at which the voltage is to be set, a current source 2 having its one end grounded, a Zener diode 6*a* having its one end connected to the terminal 1 and to the other end of the current source 2 (through a terminal 8*a*), a resistor 5*a* (having a resistance value R1) having its one end connected to the terminal 1, a relay 7*a* having its one end connected to the other end of the current source 2, a Zener diode 6*b* having its one end connected to the other end of the resistor 5*a*, to the other end of the Zener diode 6*a*, and to the other end of the relay 7*a* (through a terminal 8*b*), a resistor 5*b* (having a resistance value R2) having its one end connected to the other end of the resistor 5*a* and to the other end of the Zener diode 6*a*, a relay 7*b* having its one end connected to the other end of the Zener diode 6*a* (through the terminal 8*b*) and to the other end of the relay 7*a*, a Zener diode 6*c* having its one end connected to the other end of the resistor 5*b*, to the other end of the Zener diode 6*b*, and to the other end of the relay 7*b* (through a terminal 8*c*), and its other end grounded, a resistor 5*c* (having a resistance value R3) having its one end connected to the other end of the resistor 5*b* and to the other end of the Zener diode 6*b* and its other end grounded, and a relay 7*c* having its one end connected to the other end of the Zener diode 6*b* (through the terminal 8*c*) and to the other end of the relay 7*b*, and its other end grounded (through a terminal 8*d*). Although FIG. 1 shows a voltage setting circuit having three resistors 5*a* to 5*c*, three Zener diodes 6*a* to 6*c*, and three relays 7*a* to 7*c*, the resistor 5*b*, Zener diode 6*b*, and relay 7*b* may be omitted, for example.

The voltage setting circuit shown in FIG. 1 also has a resistor 4*a* (having a resistance value R4) having its one end connected to a voltage source 3 (having a potential VB) and its other end connected to the terminal 1, and a resistor 4*b* (having a resistance value R5) having its one end connected to the terminal 1 and its other end grounded.

While the Zener diodes 6*a* to 6*c* are reverse-biased by the voltage source 3, they are all supplied with a voltage below the Zener voltage, and therefore the Zener diodes 6*a* to 6*c* are in an open state from the circuit standpoint. Usually, the relays 7*a* to 7*c* are all set in a nonconductive-state.

Figure 2:
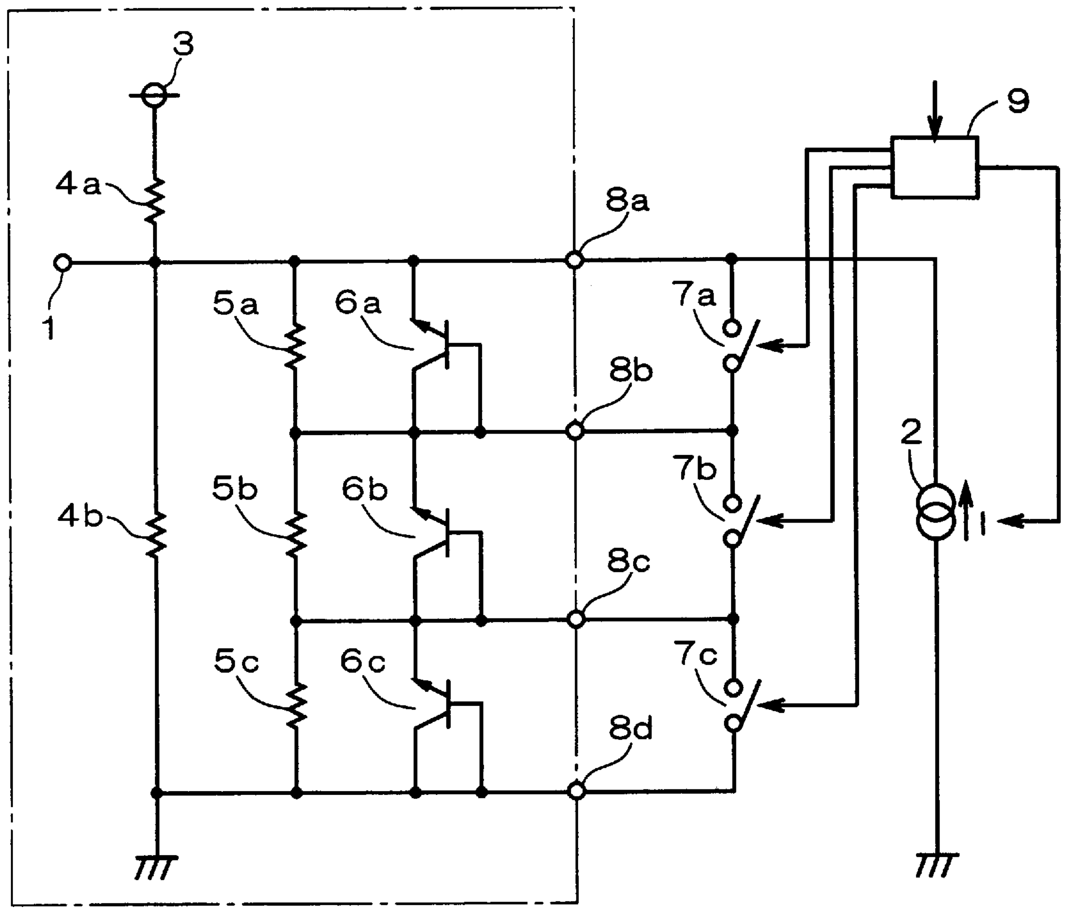
FIG. 2 is a circuit diagram showing another structure of the voltage setting circuit of the first preferred embodiment of the invention.

FIG. 2 is a circuit diagram showing another structure of the voltage setting circuit of the first preferred embodiment of the invention. A controller 9 is externally supplied with data showing which of the Zener diodes 6*a* to 6*c* are to be Zener-zapped. The controller 9 sets the relays 7*a* to 7*c* individually in conductive-state/non-conductive-state on the basis of the input data and also appropriately sets the current value of the current I supplied from the current source 2.

Figure 3:
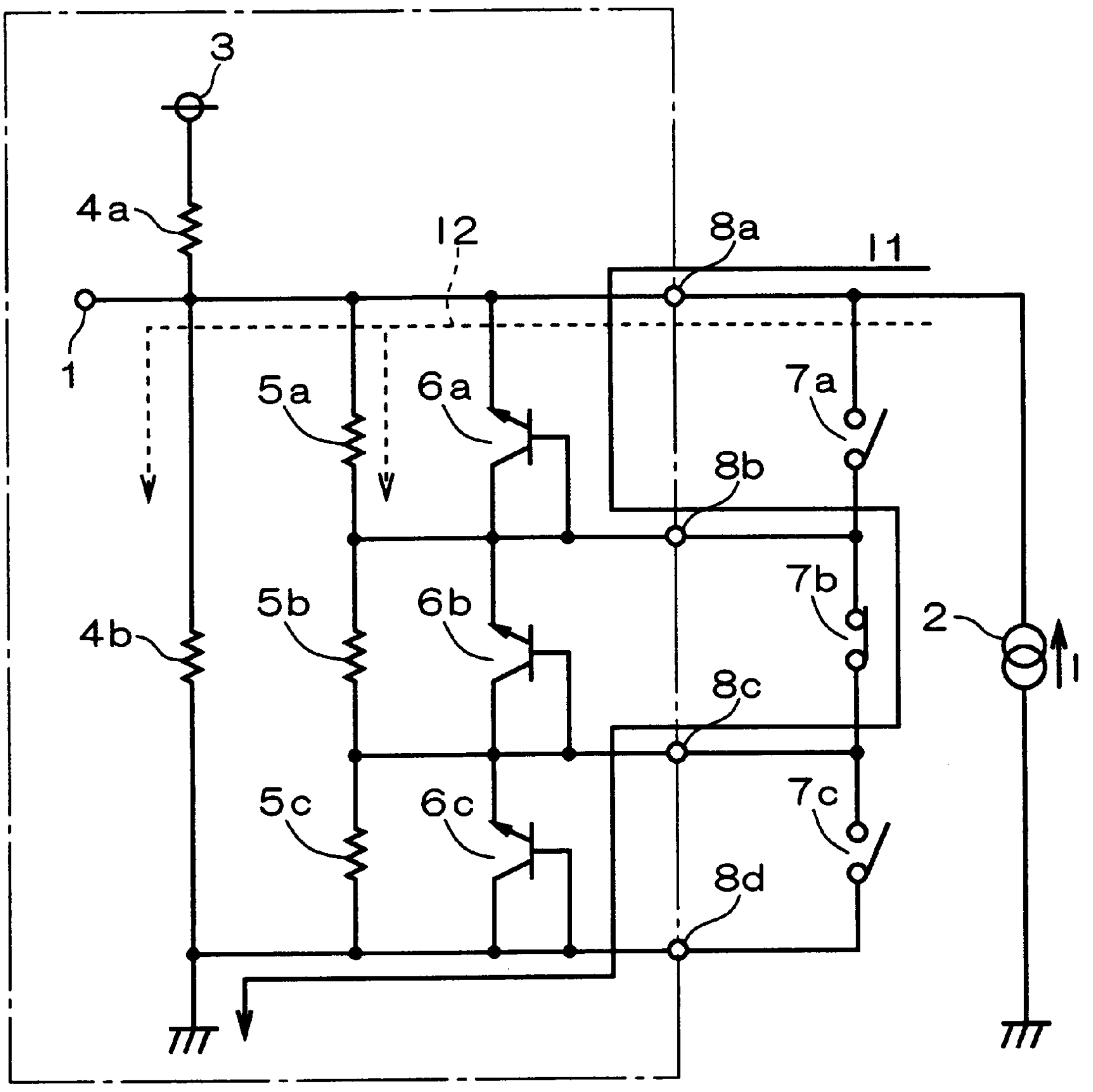
FIG. 3 is a circuit diagram showing the structure of the voltage setting circuit after the relays have been set in the nonconductive state/conductive state.
Figure 5:
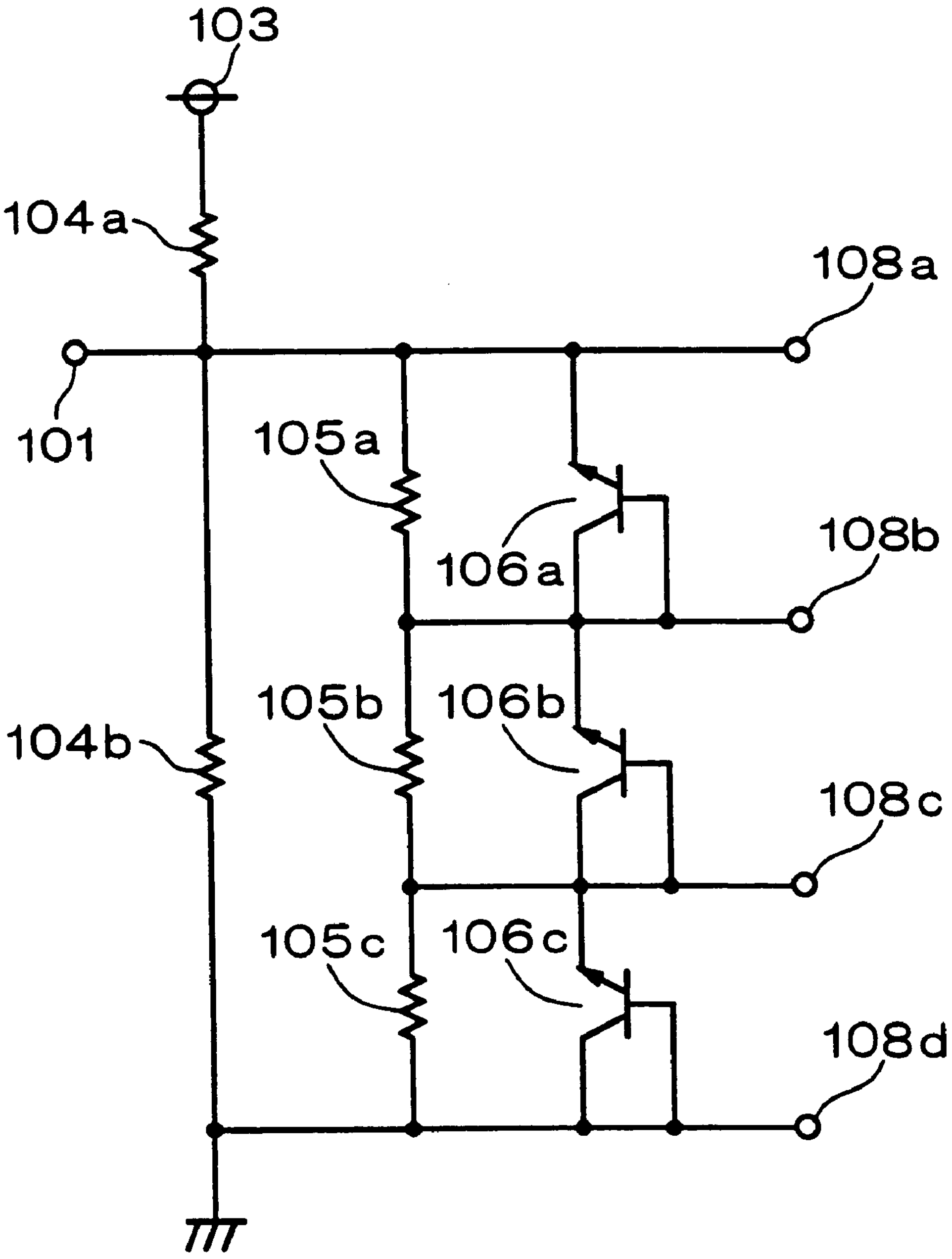
FIG. 5 is a circuit diagram showing the structure of part of a semiconductor integrated circuit.
Figure 6:
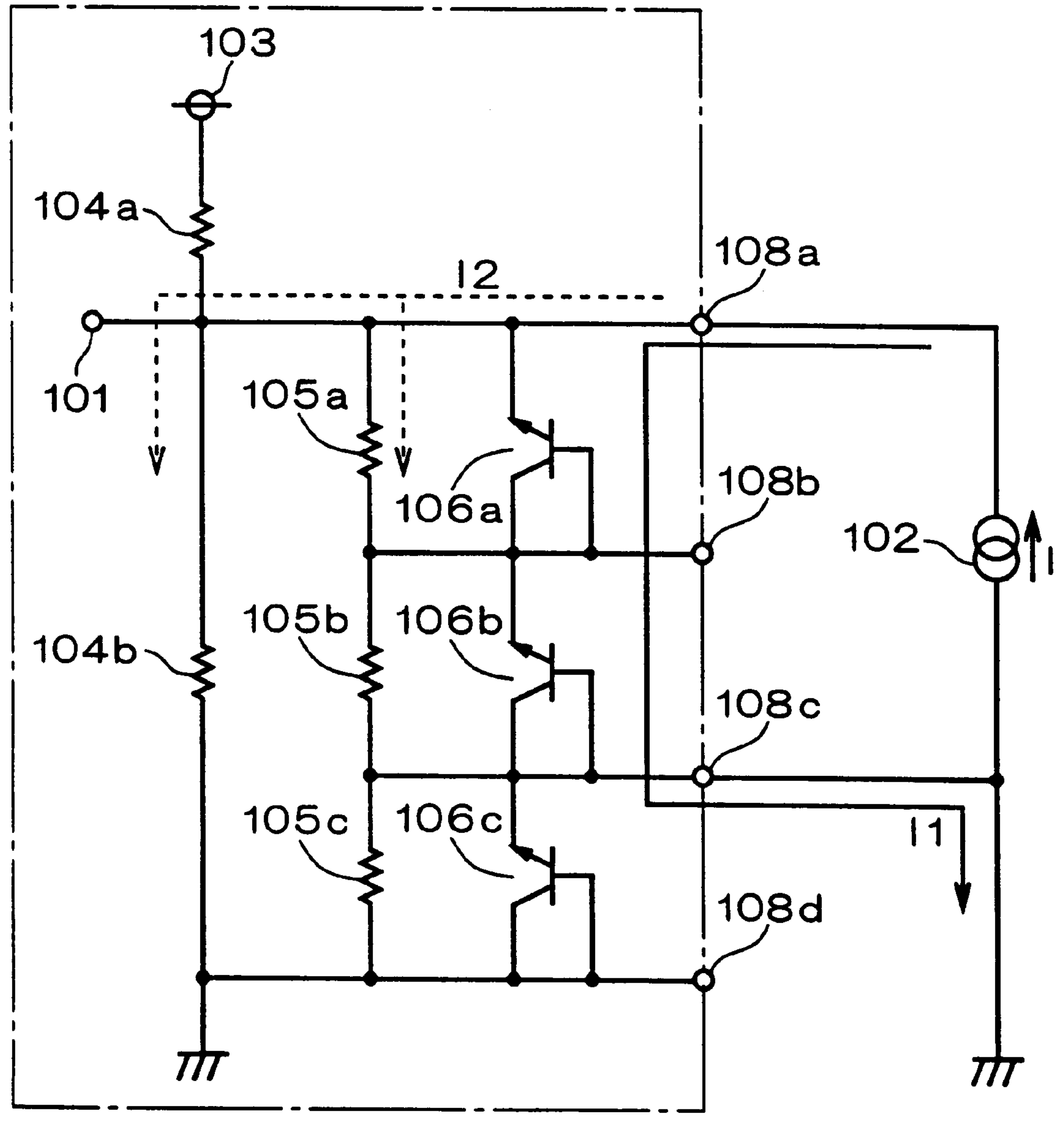
FIG. 6 BACKGROUND ART
FIG. 6 is a circuit diagram showing an example of a voltage setting circuit.
Figure 7:
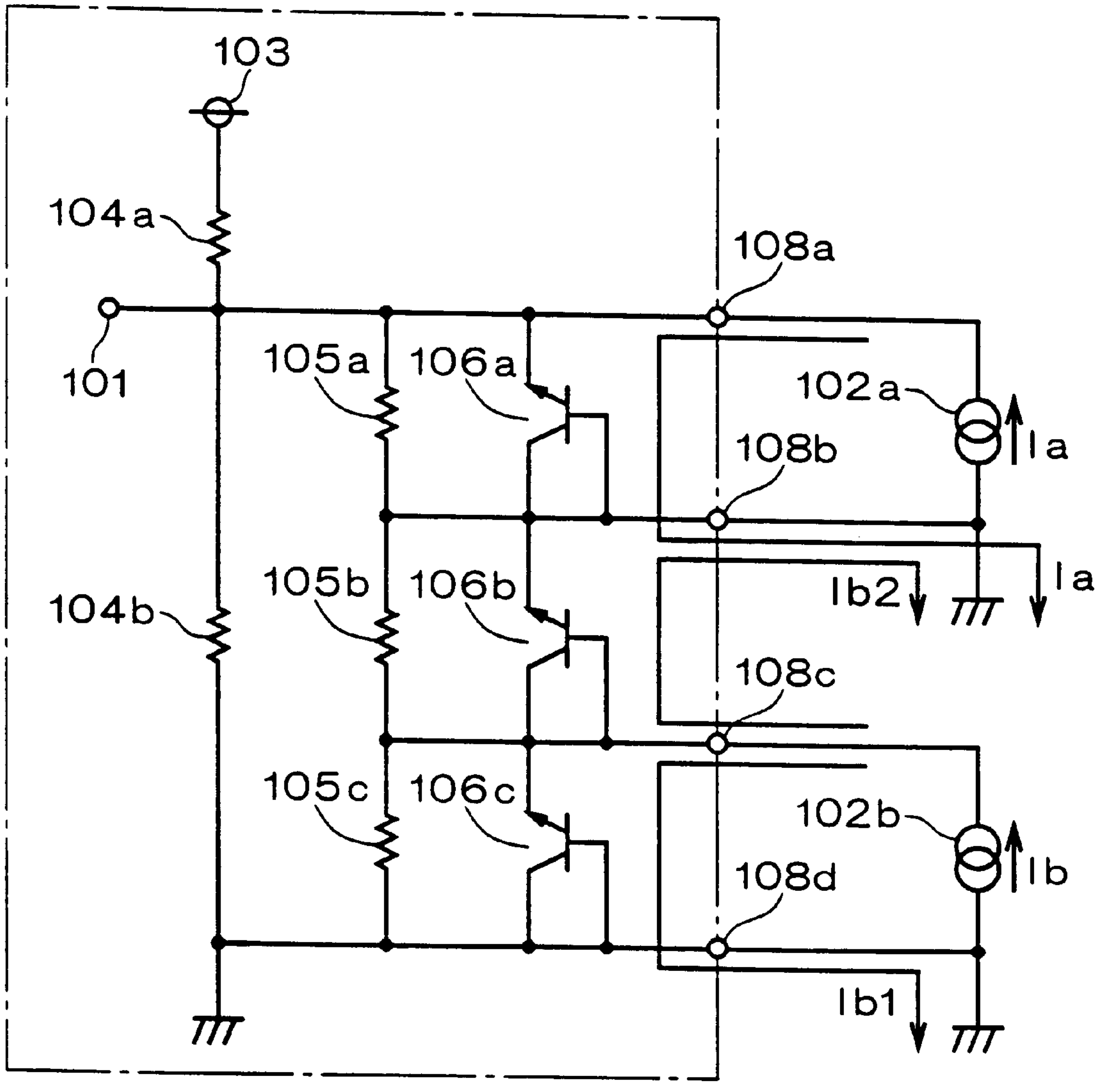
FIG. 7 BACKGROUND ART
FIG. 7 is a circuit diagram showing another example of the voltage setting circuit.

Now a method for setting the potential $V_{ref}$ using the voltage setting circuit shown in FIG. 1 is described. First, it is specified which of the Zener diodes 6*a* to 6*c* should undergo Zener breakdown (i.e., should be Zener-zapped). Here, by way of example, the Zener diodes 6*a* and 6*c* are specified. Next, in correspondence with the indication as to whether the Zener diodes 6*a* to 6*c* are Zener-zapped or not, the relays 7*a* to 7*c* are individually set in the nonconductive-state/conductive-state. In this example, the relays 7*a* and 7*c* connected in parallel to the Zener diodes 6*a* and 6*c* to be Zener-zapped are set in the nonconductive-state and the relay 7*b* connected in parallel to the Zener diode 6*b* not to be Zener-zapped is set in the conductive-state. FIG. 3 is a circuit diagram showing the structure of the voltage setting circuit after the relays 7*a* to 7*c* have been set in the nonconductive-state/conductive-state.

Next, the current I is supplied from the current source 2 through the terminal 8*a*. Then, as shown in FIG. 3, the current I1 flows through the terminal 8*a*, Zener diode 6*a*, terminal 8*b*, relay 7*b*, terminal 8*c*, and Zener diode 6*c* in this order. Then, as the current I1 flows in the reverse direction to the Zener diodes 6*a* and 6*c*, the current I1 causes the Zener diodes 6*a* and 6*c* to undergo Zener breakdown. While other part of the current I flows to the resistors 4*b*, 5*a*, 5*b* as the current 12, the current value of the current I is set sufficiently large so that the current value of the current I1 can be large enough to cause the Zener diodes 6*a* and 6*c* to cause Zener breakdown.

When the Zener diodes 6*a* and 6*c* cause Zener breakdown, one end and the other end of the Zener diode 6*a* and one end and the other end of the Zener diode 6*c* are short-circuited. As a result, one end and the other end of the resistor 5*a* connected in parallel to the Zener diode 6*a*, and one end and the other end of the resistor 5*c* connected in parallel to the Zener diode 6*c* are short-circuited by the Zener diodes 6*a* and 6*c*, respectively, and then the resistors 5*a* and 5*c* do not function as resistance from the circuit standpoint. Accordingly, in this case, the potential $V_{ref}$ at the terminal 1 is given as (R5//R2)·VB/(R4+(R5//R2).

FIG. 4 is a diagram showing the correspondence between Zener diodes to be Zener-zapped and relays to be set in the conductive state. In the example described above, the Zener diodes 6*a* and 6*c* are Zener-zapped. However, the Zener diodes 6*a* to 6*c* can be Zener-zapped in arbitrary combination, in which case given relays are set in the conductive-state in accordance with the correspondence shown in FIG. 4. For example, when Zener-zapping the Zener diodes 6*b* and 6*c*, only the relay 7*a* is set in the conductive-state according to the correspondence shown in the fifth line from the top in FIG. 4, and the other relays 7*b* and 7*c* are set in the nonconductive-state.

As stated above, according to the Zener zapping device of the first preferred embodiment and the Zener zapping method using the Zener zapping device, arbitrary one(s) of the Zener diodes 6*a* to 6*c* are made to cause Zener breakdown to short-circuit both ends of arbitrary one(s) of the resistors 5*a* to 5*c*, and the combined resistance value of the resistors 4*a*, 4*b*, and 5*a* to 5*c* can be varied, thus enabling the potential $V_{ref}$ at the terminal 1 to be highly accurately set to a desired value.

Furthermore, since the relays 7*a* to 7*c* are connected in parallel to the Zener diodes 6*a* to 6*c*, the current in the reverse direction can be passed to arbitrary one(s) of the Zener diodes 6*a* to 6*c* by arbitrarily setting the relays 7*a* to 7*c* in the conductive-state/nonconductive-state. Accordingly, unlike the conventional Zener zapping device, the current to the Zener diode 6*a* and the current to the Zener diode 6*c* do not have to be supplied separately, which reduces the time required for Zener-zapping. Furthermore, the Zener zapping device can be constructed by using a single current source, thus enabling reduction of the device scale.

While the invention has been described in detail, the foregoing description is in all aspects illustrative and not restrictive. It is understood that numerous other modifications and variations can be devised without departing from the scope of the invention.

What is claimed is:

1. A Zener zapping device for selectively Zener-zapping a plurality of Zener diodes in a semiconductor integrated circuit having said plurality of Zener diodes connected in series and a plurality of external terminals, each of said plurality of external terminals respectively connected to one end of said series connection of said Zener diodes, to a plurality of series connection points of said series connection of said Zener diodes, and to the other end of the series connection of said Zener diodes;

said Zener zapping device comprising:

a single current source having one end grounded and another end connected to said external terminal corresponding to said one end of said series connection of said Zener diodes; and a plurality of switches connected in series and connected across said plurality of Zener diodes and configured to selectively make a conductive state between each of said plurality of external terminals to thereby selectively Zener zap predetermined Zener diodes using current from said single current source.

2. The Zener zapping device according to claim 1, further comprising a controller receiving indication as to which of said plurality of Zener diodes are to be Zener zapped as data from outside, for individually setting said plurality of switches in a conductive-state/nonconductive-state on the basis of said data and also setting a current value of a current supplied from said current source.

3. The Zener zapping device according to claim 1, wherein said switches are relays.

4. A Zener zapping method using a plurality of Zener diodes connected in series and a plurality of external terminals, each of said plurality of external terminals respectively connected to one end of said series connection of said Zener diodes, to a plurality of series connection points of said series connection of said Zener diodes, and to the other end of the series connection of said Zener diodes, a Zener zapping device including a single current source having one end grounded and another end connected to said external terminal corresponding to one end of said series connection of said Zener diodes, and a plurality of switches connected in series and connected across said plurality of Zener diodes and configured to selectively make a conductive state between each of said plurality of external terminals, comprising the steps of:

turning said switches off or on in correspondence with which of said plurality of Zener diodes are to be Zener-zapped; and supplying a current from said single current source to the Zener diode which is to be Zener-zapped.

* * * * *